(12) United States Patent
Niesen et al.

(10) Patent No.: US 10,495,762 B2
(45) Date of Patent: Dec. 3, 2019

(54) NON-LINE-OF-SIGHT (NLOS) SATELLITE DETECTION AT A VEHICLE USING A CAMERA

(71) Applicant: QUALCOMM Incorporated, San Diego, CA (US)

(72) Inventors: Urs Niesen, Summit, NJ (US); Arvind Ramanandan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 15/599,712

(22) Filed: May 19, 2017

(65) Prior Publication Data

US 2018/0335525 A1 Nov. 22, 2018

(51) Int. Cl.
*G01S 19/45* (2010.01)
*G01C 21/36* (2006.01)
*H04B 7/185* (2006.01)
*G06K 9/00* (2006.01)

(52) U.S. Cl.
CPC ............ *G01S 19/45* (2013.01); *G01C 21/362* (2013.01); *G01C 21/3623* (2013.01); *G01C 21/3676* (2013.01); *G06K 9/00791* (2013.01); *H04B 7/18513* (2013.01)

(58) Field of Classification Search
CPC .............................. G01S 19/45; G01C 21/3623
See application file for complete search history.

(56) References Cited

U.S. PATENT DOCUMENTS

| | | | |
|---|---|---|---|
| 6,946,978 B2 | 9/2005 | Schofield | |
| 7,979,172 B2 | 7/2011 | Breed | |
| 8,941,537 B2* | 1/2015 | Ben-Moshe | G01S 19/22 342/357.61 |
| 9,103,671 B1 | 8/2015 | Breed et al. | |
| 9,400,930 B2 | 7/2016 | Moeglein et al. | |
| 9,405,972 B2 | 8/2016 | Moeglein et al. | |
| 2011/0074632 A1* | 3/2011 | Yeo | G01S 5/0273 342/387 |
| 2012/0293365 A1* | 11/2012 | Ashjaee | G01S 19/22 342/357.25 |
| 2013/0278466 A1* | 10/2013 | Owen | G01S 1/02 342/464 |

(Continued)

OTHER PUBLICATIONS

International Search Report and Written Opinion—PCT/US2018/027322—ISA/EPO—dated Jun. 28, 2018.

(Continued)

*Primary Examiner* — Ramsey Refai
(74) *Attorney, Agent, or Firm* — Thien T. Nguyen (57) ABSTRACT

Techniques provided herein are directed toward using a camera, such as a forward-facing camera, to identify non-line-of-sight (NLoS) satellites in a satellite positioning system. In particular, successive images captured by the camera of the vehicle can be used to create a three-dimensional (3-D) skyline model of one or more objects that may be obstructing the view of a satellite (from the perspective of the vehicle). Accordingly, this allows for the determination of NLoS satellites and exclusion of data from the NLoS satellites in the determination of the location of the vehicle. Techniques may further include providing the determined location of the vehicle.

26 Claims, 6 Drawing Sheets

(56) References Cited

U.S. PATENT DOCUMENTS

2015/0338522 A1* 11/2015 Miller .................. G01S 19/428
                                                                 342/357.61
2017/0059715 A1*  3/2017 Wietfeldt ................ G01S 19/26
2018/0196143 A1*  7/2018 Nishi ................. H04B 7/18515
2018/0292839 A1* 10/2018 Wei ...................... G05D 1/0274

OTHER PUBLICATIONS

Meguro J., et al., "GPS Accuracy Improvement by Satellite Selection Using Omnidirectional Infrared Camera," Intelligent Robots and Systems, 2008 IROS 2008 IEEE/RSJ International Conference on, IEEE, Piscataway, NJ, USA, Sep. 22, 2008 (Sep. 22, 2008), XP031348241, pp. 1804-1810, ISBN: 978-1-4244-2057-5.

Petovello M., et al., "Skyline Positioning in Urban Areas Using a Low-Cost Infrared Camera," May 2016, 8 pages.

Peyraud S., et al., "About Non-Line-Of-Sight Satellite Detection and Exclusion in a 3D Map-Aided Localization Algorithm," Sensors, 2013, vol. 13, pp. 829-847.

* cited by examiner

NON-LINE-OF-SIGHT (NLOS) SATELLITE DETECTION AT A VEHICLE USING A CAMERA

BACKGROUND

Vehicle systems, such as autonomous driving, advanced driver-assist systems (ADAS), often need highly accurate positioning information to operate correctly. Global Navigation Satellite Systems (GNSS), such as Global positioning system (GPS) and/or similar satellite-based positioning technologies can provide such positioning data in open sky scenarios. However, the performance of GPS drastically degrades if large parts of the sky are obstructed. This occurs, for example, in so-called "urban canyon" scenarios, where GPS-based estimated positions may be off by as much as 50 m. These large positioning errors can be prohibitive in vehicular automation and/or navigation.

A main cause for these large positioning errors in GPS-based positioning is measurements from non-line-of-sight (NLoS) satellites. These are satellites for which the direct line-of-sight (LoS) path from the satellite to a GNSS/GPS receiver at the vehicle is blocked, and the receiver instead erroneously tracks a NLoS signal, which may be reflected off a building or other object. Since these reflected NLoS signals can travel a path up to hundreds of meters longer, they can cause significant positioning errors. Detecting and excluding such NLoS satellites from positioning or location determinations may therefore be necessary for good positioning performance in urban scenarios. Vision-aided positioning techniques use camera information to detect these NLoS satellites. However, current vision-aided positioning techniques for determining these NLoS satellites can be costly, often requiring one or more cameras on top of the vehicle.

SUMMARY

Techniques provided herein are directed toward using a camera, such as a forward-facing camera, to detect NLoS satellites. In particular, sequential frames captured by the forward-facing camera and determined motion of the vehicle during the capturing of these frames can be used to create a three-dimensional (3-D) skyline model of one or more buildings that may be obstructing the view of a satellite (from the perspective of the receiver at the vehicle). Accordingly, this allows for the determination of NLoS satellites.

According to the description herein, an example method of identifying, with respect to a vehicle, non-line-of-sight (NLoS) satellites in a satellite positioning system, comprises obtaining a plurality of successive images captured by a camera of the vehicle, determining, from the plurality of successive images, a three-dimensional (3-D) model representative of one or more objects obstructing a view of the sky from the perspective of the vehicle, determining one or more NLoS satellites of the satellite positioning system with respect to the vehicle, based on the 3-D model, determining a location of the vehicle by excluding data from the one or more NLoS satellites of the satellite positioning system, based on the determination of the one or more NLoS satellites of the satellite positioning system, and providing the determined location of the vehicle.

The example method may comprise one or more of the following features. The camera can comprise a forward-facing camera configured to capture images in a direction of travel of the vehicle. Determining the one or more NLoS satellites may comprise using the 3-D model to simulate a view of a virtual upward-facing camera, and determining the one or more NLoS satellites with respect to the vehicle, based on the simulated view of the virtual upward-facing camera. Obtaining the plurality of successive images may be in response to a triggering event. The triggering event may comprise a determination that the vehicle is within a threshold distance of a certain region, or a determination that an image captured by the camera includes an image of an obstruction, or any combination thereof. The plurality of successive images may be captured over a certain period of time, and the method may further comprise determining a movement of the vehicle during the certain period of time. Determining the movement of the vehicle during the certain period of time may comprise obtaining motion sensor data from one or more motion sensors, the motion sensor data indicative of sensor measurements of the one or more motion sensors captured during the certain period of time. Determining the one or more NLoS satellites with respect to the vehicle may be further based on satellite information indicative of where, from the perspective of the vehicle, the one or more NLoS satellites is in the sky. The determining the 3-D model representative of one or more objects obstructing a view of the sky further may comprise tracking, over the plurality of successive images, one or more features of a building. Providing the determined location of the vehicle may comprise showing, on a display of the vehicle, the indication of the determined location of the vehicle, sending, via wireless communication, the indication of the determined location of the vehicle to a device separate from the vehicle, providing the indication of the determined location of the vehicle from one computing device of the vehicle to another, or any combination thereof.

An example computing device, according to the description, comprises a camera configured to capture a plurality of successive images from a vehicle, a satellite positioning system receiver, a memory, and a processing unit communicatively connected with the camera, the memory, and the satellite positioning system receiver. The processing unit is configured to determine, from the plurality of successive images, a three-dimensional (3-D) model representative of one or more objects obstructing a view of the sky from the perspective of the vehicle, determine one or more NLoS satellites of the satellite positioning system with respect to the vehicle, based on the 3-D model, determine a location of the vehicle by excluding data from the one or more NLoS satellites of the satellite positioning system, based on the determination of the one or more non-line-of-sight (NLoS) satellites of the satellite positioning system, and provide the determined location of the vehicle.

The example computing device can comprise one or more of the following features. The camera may comprise a forward-facing camera configured to capture images in a direction of travel of the vehicle. The processing unit may be configured to determine the one or more NLoS satellites by using the 3-D model to simulate a view of a virtual upward-facing camera, and determining the one or more NLoS satellites with respect to the vehicle, based on the simulated view of the virtual upward-facing camera. The processing unit may be configured to cause the camera to capture the plurality of successive images in response to determining a triggering event has occurred. The processing unit may be configured to determine the triggering event has occurred by determining the vehicle is within a threshold distance of a certain region, or an image captured by the camera includes an image of an obstruction, or any combination thereof. The processing unit may be configured to cause the camera to capture the plurality of successive images over a certain period of time, and determine a movement of the vehicle during the certain period of time. The computing device may comprise one or more motion sensors, wherein the processing unit is configured to determine the movement of the vehicle during the certain period of time by obtaining motion sensor data indicative of sensor measurements of the one or more motion sensors captured during the certain period of time. The processing unit may be configured to determine the one or more NLoS satellites with respect to the vehicle is based on satellite information indicative of where, from the perspective of the vehicle, the one or more NLoS satellites is in the sky. The processing unit is configured to determine the 3-D model representative of one or more objects obstructing a view of the sky further by tracking, over the plurality of successive images, one or more features of a building. The processing unit may be configured to provide the determined location by causing a display of the vehicle to show the indication of the determined location of the vehicle, causing a wireless transmitter to send, via wireless communication, the indication of the determined location of the vehicle to a device separate from the vehicle, providing the indication of the determined location of the vehicle to a second computing device, or any combination thereof.

An example apparatus, according to the description, comprises means for obtaining a plurality of successive images captured by a camera of a vehicle, means for determining, from the plurality of successive images, a three-dimensional (3-D) model representative of one or more objects obstructing a view of the sky from the perspective of the vehicle, means for determining one or more NLoS satellites of the satellite positioning system with respect to the vehicle, based on the 3-D model, means for determining a location of the vehicle by excluding data from the one or more NLoS satellites of the satellite positioning system, based on the determination of the one or more non-line-of-sight (NLoS) satellites of the satellite positioning system, and means for providing the determined location of the vehicle.

The example apparatus may include one or more of the following features. The means for determining the one or more NLoS satellites may comprise means for using the 3-D model to simulate a view of a virtual upward-facing camera, and means for determining the one or more NLoS satellites with respect to the vehicle, based on the simulated view of the virtual upward-facing camera. The plurality of successive images may be captured over a certain period of time, and the apparatus may further comprise means for determining a movement of the vehicle during the certain period of time. The means for determining the movement of the vehicle during the certain period of time may comprise means for obtaining motion sensor data from motion sensing means, the motion sensor data indicative of sensor measurements of the motion sensing means captured during the certain period of time. The means for determining the 3-D model representative of one or more objects obstructing a view of the sky further comprises means for tracking, over the plurality of successive images, one or more features of a building.

An example non-transitory computer-readable medium apparatus having instructions embedded thereon for identifying, with respect to a vehicle, non-line-of-sight (NLoS) satellites in a satellite positioning system, the instructions including computer code for obtaining a plurality of successive images captured by a camera of a vehicle, determining, from the plurality of successive images, a three-dimensional (3-D) model representative of one or more objects obstructing a view of the sky from the perspective of the vehicle determining one or more NLoS satellites of the satellite positioning system with respect to the vehicle, based on the 3-D model, determining a location of the vehicle by excluding data from the one or more NLoS satellites of the satellite positioning system, based on the determination of the one or more non-line-of-sight (NLoS) satellites of the satellite positioning system, and providing the determined location of the vehicle.

The example non-transitory computer-readable medium may include one or more of the following features. The computer code for determining the one or more NLoS satellites may comprise computer code for using the 3-D model to simulate a view of a virtual upward-facing camera, and determining the one or more NLoS satellites with respect to the vehicle, based on the simulated view of the virtual upward-facing camera. The plurality of successive images may be captured over a certain period of time, and the instructions may further include computer code for determining a movement of the vehicle during the certain period of time. The computer code for determining the movement of the vehicle during the certain period of time may comprise computer code for obtaining motion sensor data from motion sensing means, the motion sensor data indicative of sensor measurements of the motion sensing means captured during the certain period of time. The computer code for determining the 3-D model representative of one or more objects obstructing a view of the sky may further comprise computer code for tracking, over the plurality of successive images, one or more features of a building.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Figure 1A:
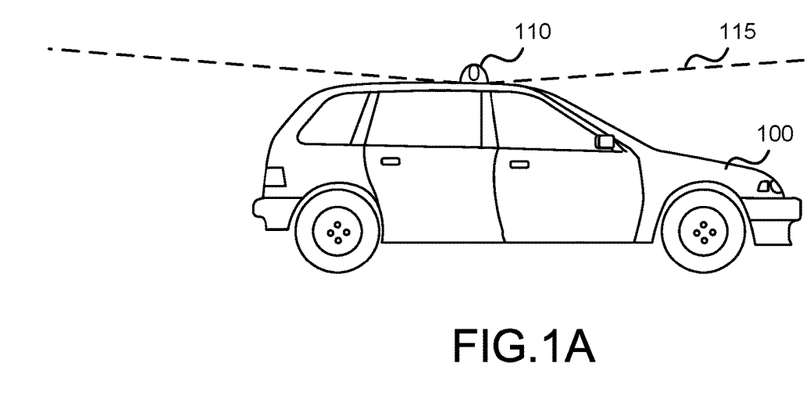
FIGS. 1A-1B are profile views of a vehicle, illustrating example placements of upward-facing and forward-facing cameras on the vehicle.
Figure 1B:
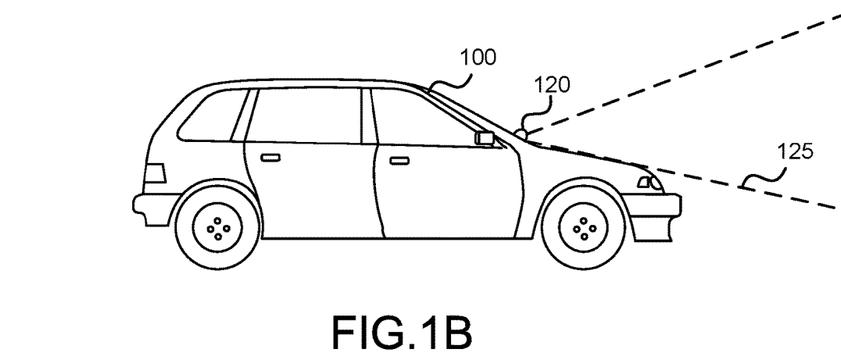

As previously mentioned, one technique for detecting NLoS satellites of a satellite-based positioning system is to use an upward-facing camera, as illustrated in FIG. 1A. (It can be noted that, although the vehicle 100 in FIGS. 1A-1B is illustrated as an automobile, embodiments are not so limited. Techniques provided herein may be utilized in a variety of applications on a variety of vehicles.) Here, because the camera 110 is placed on top of the vehicle 100, the camera 110 has an unobstructed view of the sky. Moreover, the camera 110 may include a fisheye lens to provide it with a very large field of view (FOV) 115. Accordingly, images from the camera 110 can provide an accurate determination of which portions of the sky are and are not blocked by buildings and/or other obstructions. Using that information, along with the known satellite elevation and azimuth angles, it may be determined which satellites are NLoS (i.e., which satellites do not have a direct LoS to the vehicle due to an obstruction). This approach can be effective at determining which satellites are NLoS, but has the disadvantage that it requires a dedicated upward-facing camera.

Techniques provided herein resolve these and other issues by utilizing a forward-facing camera, as illustrated in FIG. 1B. That is, rather than having an upward facing camera, embodiments herein enable the use of a forward-facing camera 120 of a vehicle 100, providing an FOV 125 generally directed toward the direction of travel of the vehicle 100. This can be advantageous in many ways because, among other things, such front facing cameras 120 exist in many modern-day cars to provide various functions related to safety, autonomous and/or semi-autonomous driving, etc. Therefore, the techniques provided herein can take advantage of existing forward-facing cameras 120, rather than requiring a dedicated upward-facing camera 110. (It can be noted, however, that techniques described herein are not limited to forward-facing cameras and may additionally or alternatively utilized one or more cameras facing other directions, depending on desired functionality.)

The use of a forward-facing camera 120, however, is nontrivial. A dedicated upward-facing camera 110 has a wide FOV 115 which enables it to capture images of the entire skyline surrounding the vehicle 100. Thus, it is a relatively easy process of determining NLoS satellites based on an image captured by the upward-facing camera 110, the orientation of the vehicle (e.g., with respect to earth), and information regarding where satellites are located (e.g., with respect to earth). In contrast, the forward-facing camera 120 may have a relatively narrow FOV 125. It therefore may not be able to capture images of buildings or other obstructions to the side or behind the vehicle 100 (e.g., outside the FOV 125 of the forward-facing camera 120).

To overcome this limitation, embodiments may utilize techniques to construct a 3-D skyline model using successive frames captured by the forward-facing camera. As used herein, the term "3-D skyline model" is used to refer to a set of data that can be used to determine, from the perspective of the vehicle 100, which portions of the sky are obstructed and which are not. This can be, for example, a volumetric data set representing structures (e.g., via points, polygons, etc.) that may obstruct the vehicle's view (or, more accurately, the view of the vehicle's satellite receiver) of a satellite. In some embodiments, the 3-D skyline model may be used to simulate the view of a "virtual" upward-facing camera, in which case traditional algorithms could then be used to determine NLoS satellites. Data received from NLoS satellites identified in this manner can then be disregarded and/or adjusted to mitigate inaccuracies in a position determination based on satellite information.

Figure 2A:
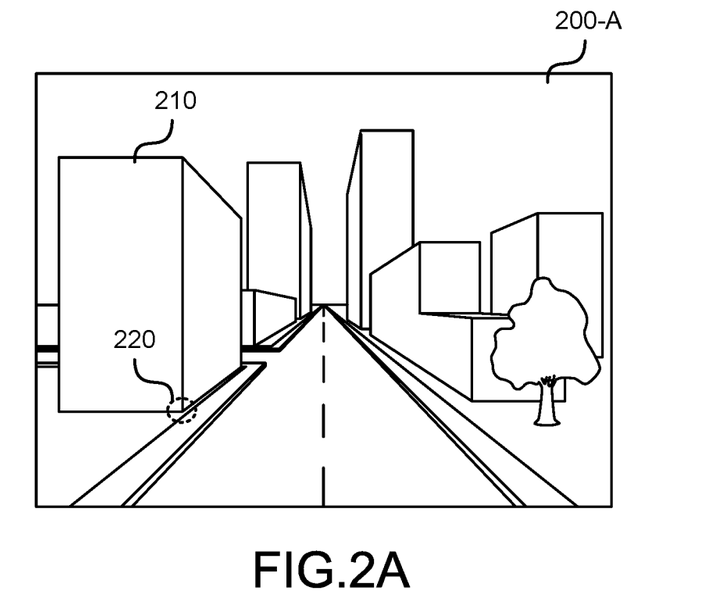
FIGS. 2A-2B are illustrations of example images, or frames, captured in succession by a forward-facing camera of a vehicle, according to an embodiment.
Figure 2B:
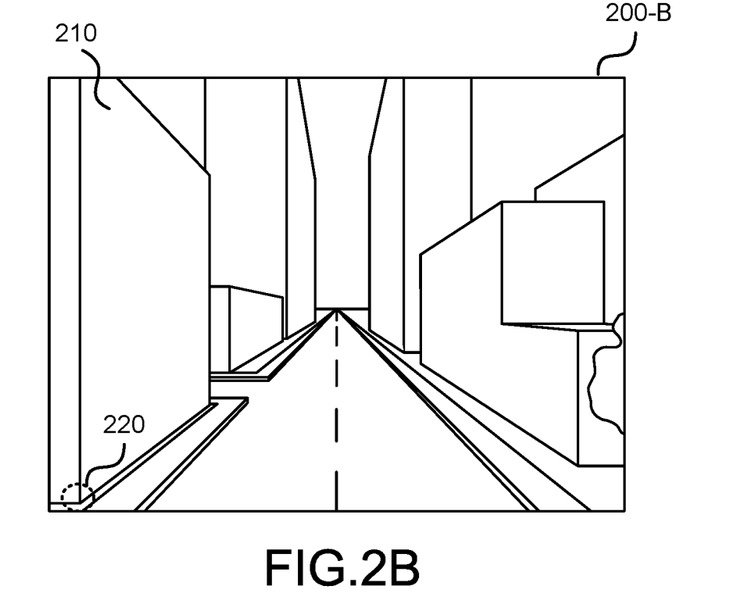

FIGS. 2A-2B are illustrations of successive frames 200-A and 200-B (collectively referred to herein as frames 200) captured by a forward-facing camera of a vehicle, to help illustrate how a 3-D skyline model may be constructed. Depending on desired functionality, frames from a forward-facing camera may be routinely captured and stored as part of a separate function of the vehicle (as part of autonomous or semi-autonomous driving functions, for example), in which case the frames 200 may simply be retrieved from a memory to create the 3-D skyline model. In other embodiments, these frames may be captured on demand for use in the creation of the 3-D skyline model. In some embodiments, frame capturing can be in response to a triggering event (as described in more detail below).

Frame 200-A represents a first image captured by the forward-facing camera, as the vehicle approaches various obstructions, including building 210. To help ensure that an accurate 3-D skyline model is created, embodiments may ensure that the forward-facing camera begins capturing images when all or a large portion of each obstruction is viewable within the FOV of the forward-facing camera. This can help ensure that an accurate representation of each obstruction is created in the 3-D skyline model.

Frame 200-B represents a second image captured by the forward-facing camera, as the vehicle approaches in moves through the various obstructions. Frame 200-B is successive to frame 200-A, enabling motion-tracking algorithms to track the movement of various features in both frames 200. A computer or other processing device on the vehicle can perform image processing of frame 200-A to identify various features in the frame 200-A. These features can include, for example, edges, corners, colors, areas, and/or other features detectable by image processing. Image processing is then performed on frame 200-B to detect those same features (e.g., by using one or more feature tracking algorithms), and determine the motion of those features between the frames. Information regarding this motion, along with information regarding the movement of the vehicle, can be used to create the 3-D skyline model.

For example, image processing of frame 200-A may detect a corner 220 of the building 210, and image processing of frame 200-B may again detect the corner 220. Feature-tracking algorithms can then use these detected features to determine that the corner 220 has moved down and to the left. Other features of the building 210 can be tracked similarly. Additionally, movement of the vehicle between these successive frames 200 may also be tracked, using position information (e.g., from GPS, OTDOA, and/or other positioning methods), velocity information (e.g. from the car's speedometer), movement sensor information (e.g. from accelerometers and/or other inertial measurement units (IMUs)), and the like. With the information regarding the movement of the features of the building 210 between frames 200, along with information regarding the movement of the vehicle between those frames 200, a 3-D model of the building 210 can be created. Other objects in the vehicle's surroundings (including other potential obstructions) may be modeled in the same way, enabling for an entire 3-D skyline model of detected obstructions to be created.

It can be noted that the frames 200 are provided here only as an illustrative example. For a given period of time, there may be a much larger number of frames from which the 3-D skyline model is created. The number of frames may vary, depending on a frame rate of the camera. Moreover, this frame rate may vary depending on other factors, such as speed of the vehicle. Nonetheless, a person of ordinary skill in the art will appreciate that the number and frequency of frames captured for 3-D skyline model creation can vary, and a desired minimum number of frames for a given speed may be determined, to help ensure accurate image processing of the frames 200 and 3-D skyline model creation. Other features of the frames, such as color, resolution, and the like, may also vary depending on desired functionality.

It can be noted that, in some embodiments, moving obstructions (such as other vehicles) can be identified and ignored because such moving obstructions often are not big enough to obstruct a portion of the sky and/or temporary enough to not affect position determination adversely. That said, some embodiments may track moving obstructions in a manner similar to tracking stationary obstructions.

Figure 3:
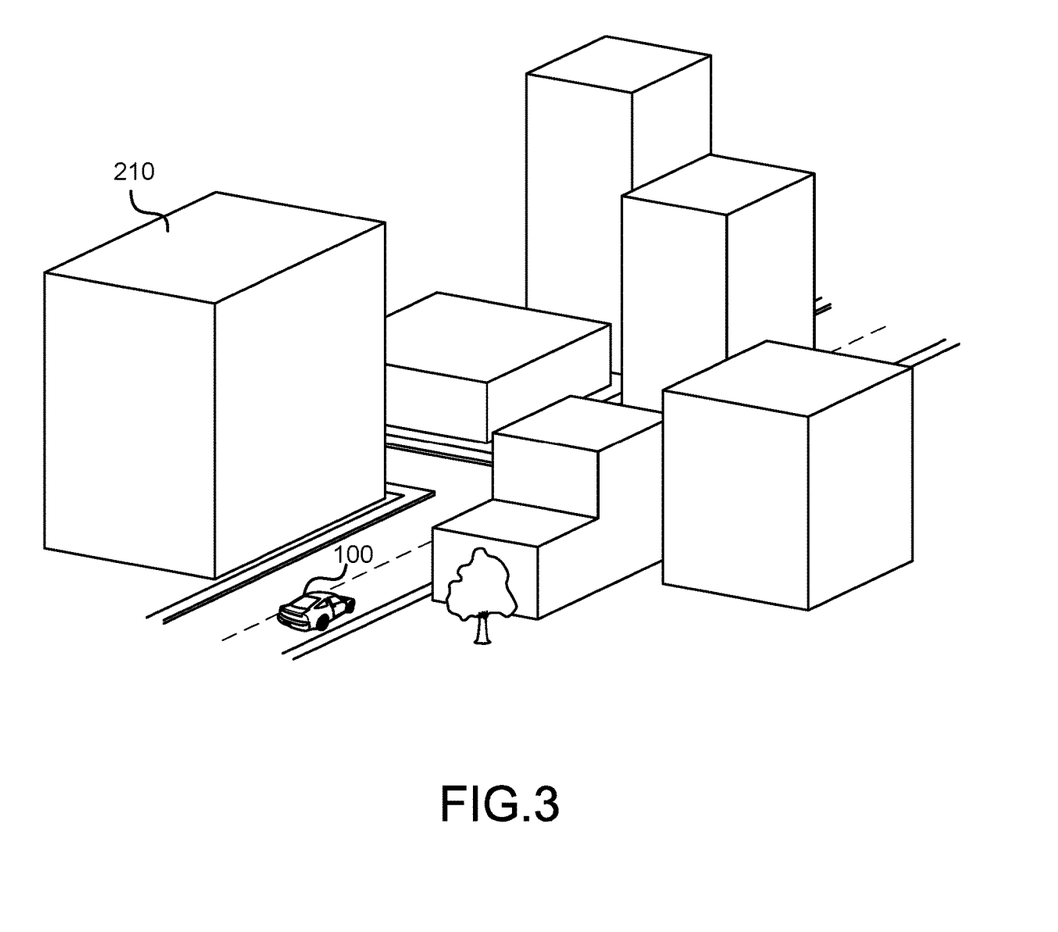
FIG. 3 is an illustration of a visual representation of a 3-D skyline model created from the frames of FIGS. 2A-2B, according to an embodiment.

FIG. 3 is a representation of a 3-D skyline model, created from the frames 200 of FIGS. 2A-2B. Here, the building 210 and other obstructions in the vicinity of the vehicle 100 are represented as three-dimensional structures surrounding a representation of the vehicle 100. Of course, such a visualization of the 3-D skyline model does not need to be created in order to determine NLoS satellites, however the representation illustrated in FIG. 3 is provided for illustrative purposes.

Here, the obstructions in the 3-D skyline model enable an on-board computer of the vehicle 100 (and/or other computing device) to determine which portions of the sky are obstructed and which are not. In some instances, the determination may be made with respect to the location of a receiver in the vehicle 100. In some instances, as discussed above, this determination may involve determining what an upward-facing camera would see, if the vehicle 100 had an upward-facing camera (effectively creating a "virtual" upward-facing camera). In either case, satellite information can also be used, along with orientation information of the vehicle (e.g., as determined by a compass and/or other sensors), to determine where, in the sky, relevant satellites are located with respect to the vehicle 100. If these portions of the sky are determined to be obstructed, then satellites in the obstructed portions of the sky would be NLoS satellites, and any information received from the NLoS satellites could be disregarded and/or adjusted accordingly for determination of the vehicle's location.

A person of ordinary skill in the art appreciate that the creation of the 3-D skyline model can be made in any of a variety of ways, based on images captured from the forward-facing camera of a vehicle. One such way involves the utilization of a "structure from motion" algorithm. This type of algorithm can, given a set of camera frames and the inter-frame rotational and translational displacement, compute the 3-D location of point features that appears in the camera frames.

Figure 4:
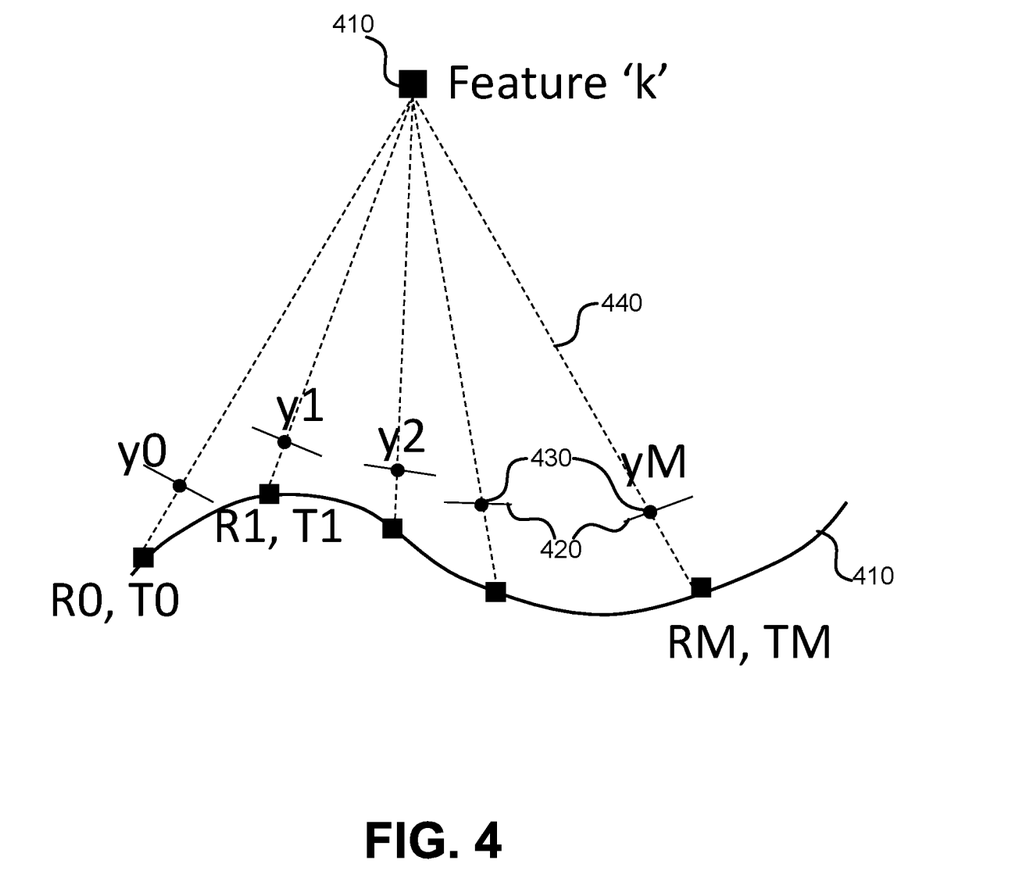
FIG. 4 is a simplified two dimensional diagram illustrating how a "structure from motion" algorithm can work, according to an embodiment.

FIG. 4 is a simplified two dimensional diagram illustrating how a "structure from motion" algorithm can work, according to an embodiment. Here, a camera captures frames 0, 1, ..., M of feature k (e.g., a feature of an object captured in an image). In the figure, box 410 is the true 3-D location of the feature k, lines 420 represent the camera's image plane, points 430 represent the perspective projection of the feature k onto the camera image. (Note that, for simplicity, not all like features are labeled in FIG. 4). This results in camera measurements y0, y1, ..., yM. Dotted lines 440 are back projections of the camera measurement to the physical 3-D point of feature k. R0, T0, ..., RM, TM are rotational and translational displacements of frames 0, ..., M respectively, along a path of movement 410.

Let $\hat{f}$ be the estimate of feature location in any camera frame of choice, say M. Using $\hat{f}$, we can compute $\hat{y}_0(\hat{f}), \ldots, \hat{y}_{M-1}(\hat{f})$ (estimates of camera measurements at respective frames 0, ..., M−1). A computer can then solve for $\hat{f}$ as the minimizer of the least-squares reprojection error $$\Sigma_{i=0}^{M-1} \|y_i - \hat{y}_i(\hat{f})\|^2. \tag{1}$$

As noted previously, we can determine relative displacements (R0, T0, ..., RM, TM) using any of a variety of information sources available to the vehicle. These information's can include, for example, GPS (or another satellite positioning system), position determination based on terrestrial transceivers, visual inertial odometry, wheel odometry, high definition (HD) city maps, IMUs, and the like.

Figure 5:
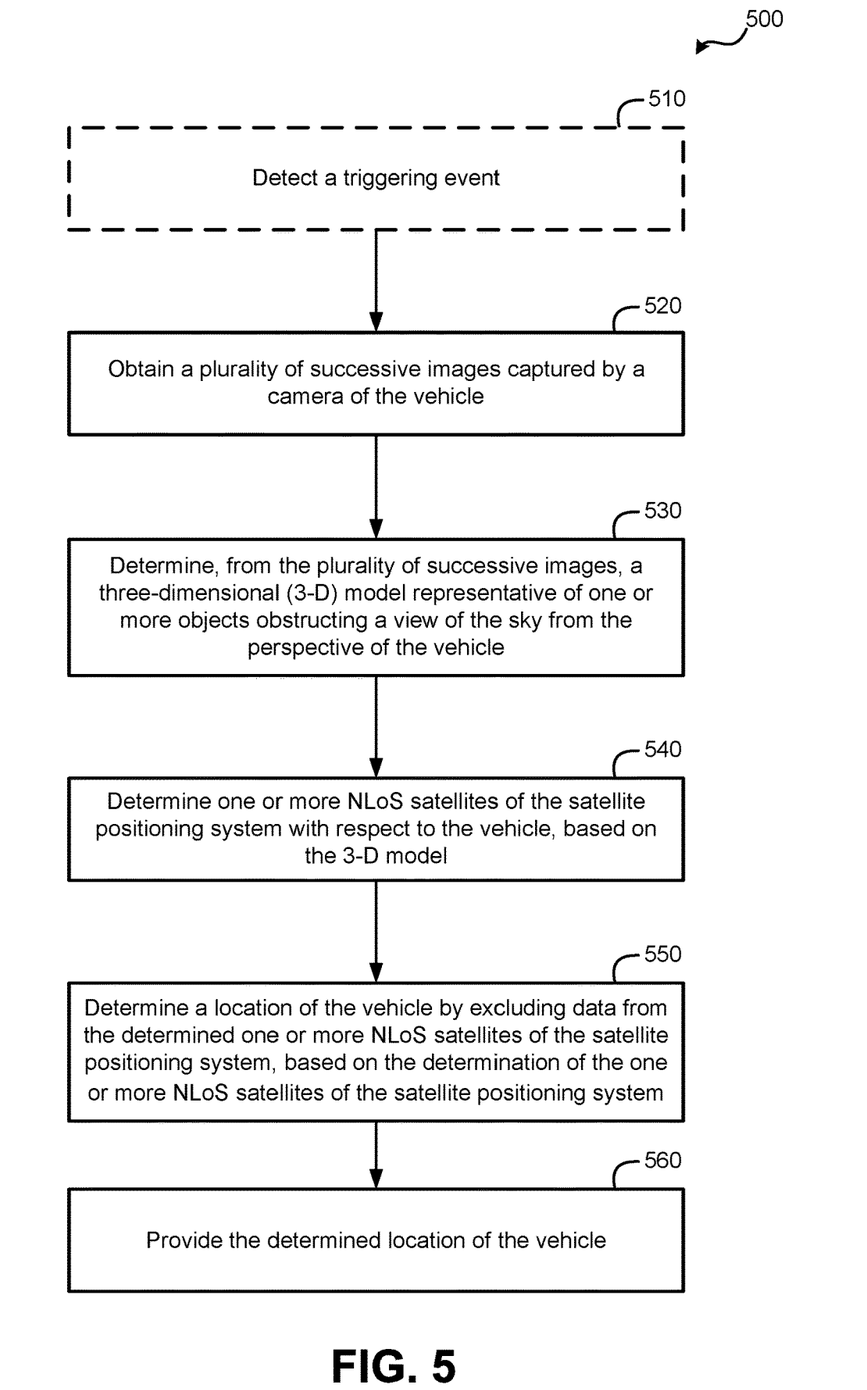
FIG. 5 is a flow diagram illustrating an embodiment of a method of identifying NLoS satellites in a satellite positioning system, with respect to a vehicle.

FIG. 5 is a flow diagram illustrating a method 500 of identifying NLoS satellites in a satellite positioning system, with respect to a vehicle. One or more of the functions described in the blocks of the method 500 can be executed, for example, using hardware and/or software components of an on-board computing system or other computer of the vehicle, such as the computer illustrated in FIG. 6 and described in more detail below. That said, one or more of the functions of the illustrated blocks may additionally or alternatively be performed by one or more devices remote from the vehicle. Furthermore, as with all other figures herein, the method 500 provided in FIG. 5 is a non-limiting example. A person of ordinary skill in the art will appreciate that alternative embodiments may combine, separate, add, omit, rearrange, and/or alter the functionality of the blocks of method 500, depending on desired functionality.

In some embodiments, the method 500 can begin at optional block 510, where the functionality includes detecting a triggering event. Triggering events may include any of a variety of triggers indicating that the vehicle may be approaching (e.g., is within a threshold distance of) a region in which obstructions may create NLoS satellites that could interfere with position determination. One such triggering event can include, for example, a determined location of the vehicle, such as a determination (e.g., using position information from GPS and/or other position information sources) that the vehicle has come within a threshold distance of a known "urban canyon" or other location (e.g., an actual canyon) where portions of the skyline likely will be obstructed. Another triggering event can include determining, from a frame of the camera, that the vehicle is approaching an obstruction. This can be done by periodically capturing images from the camera and/or obtaining images stored in memory (e.g., by another function of the vehicle).

In some embodiments, the functionality at block 510 may not occur. Instead, because of available resources and/or other factors, for example, the computing device may continually perform the method 500 to identify NLoS satellites.

Means for performing the functionality of block 510 can include hardware and/or software components of a computer, such as processing unit(s) 610, wireless communication interface 630, GNSS receiver 680, bus 605, memory 660, and/or sensor(s) 640 of the computing device 600 illustrated in FIG. 6 and described in more detail below.

The functionality at block 520 includes obtaining a plurality of successive images captured by a camera of the vehicle. In some embodiments, the camera may comprise a forward-facing camera configured to capture images in a direction of travel of the vehicle, although alternative embodiments may use additional or alternative cameras that substantially face other directions. Where a triggering event was detected (i.e., when the functionality at block 510 is performed), the functionality at block 520 may be performed in response. As previously mentioned, obtaining a plurality of successive images can comprise causing a camera to capture the successive images. In other cases, such images may already be captured as part of other functionality of the vehicle. In such a case, obtaining the plurality of successive images may comprise obtaining them from a memory in which they are stored.

Means for performing the functionality of block 520 can include hardware and/or software components of a computer, such as processing unit(s) 610, bus 605, memory 660, and/or sensor(s) 640 of the computing device 600 illustrated in FIG. 6 and described in more detail below.

At block 530, a 3-D model representative of one or more objects obstructing of view of the sky from the perspective of the vehicle is determined from the plurality of successive images. As indicated previously, this 3-D model can be created using "structure from motion" and/or other algorithms to process the plurality of successive images. Accordingly, according to some embodiments, the method can further comprise determining a movement (e.g., rotation and/or translation) of the vehicle during a period of time over which the plurality of successive images was captured. Embodiments may also include tracking, over the plurality of successive images, one or more features of the building (or other obstruction). This movement may be relative to an earlier captured frame. Moreover, this movement may be determined by obtaining motion sensor data (indicative of sensor readings captured during the period of time over which the plurality of successive images was captured) from one or more motion sensors.

Means for performing the functionality of block 530 can include hardware and/or software components of a computer, such as processing unit(s) 610, wireless communication interface 630, GNSS receiver 680, bus 605, memory 660, and/or sensor(s) 640 of the computing device 600 illustrated in FIG. 6 and described in more detail below.

At block 540, the functionality includes determining one or more NLoS satellites of the satellite positioning system with respect to the vehicle, based on the 3-D model. This can be done using any of a variety of ways, as explained above. For example, according to some embodiments, the 3-D model may be used to simulate the view of a virtual upward-facing camera, so that the one or more NLoS satellites may be determined with respect to the vehicle, based on the simulated view of the virtual upward-facing camera.

Determining the one or more NLoS satellites can further be based on a comparison of the 3-D model with satellite information. In particular, satellite information can indicate where, from the perspective of the vehicle, satellites of the satellite positioning system are in the sky. According to some embodiments, a computing device of the vehicle may determine the NLoS satellites in response to information received from satellites. For example, a satellite positioning system receiver in the vehicle may receive data from a satellite (including an identification of the satellite), and the computing device may then use the 3-D model and the satellite information to determine whether that satellite is an NLoS satellite. In other scenarios and/or embodiments, the computing device of the vehicle may first determine which of the satellites of a satellite positioning system are NLoS satellites based on the 3-D model, then simply disregard or adjust satellite data received from the identified NLoS satellites.

Means for performing the functionality of block 540 can include hardware and/or software components of a computer, such as processing unit(s) 610, wireless communication interface 630, GNSS receiver 680, bus 605, memory 660, and/or sensor(s) 640 of the computing device 600 illustrated in FIG. 6 and described in more detail below.

At block 550, the functionality comprises determining a location of the vehicle by excluding data from the one or more NLoS satellites of the satellite positioning system, based on the determination of the one or more NLoS satellites of the satellite positioning system. Depending on desired functionality, excluding data can be done in various ways. In some embodiments, for example, data from the NLoS satellite(s) identified in block 540 (including data already received and/or data not yet received) can simply be ignored. Additionally or alternatively, in some embodiments, the device(s) executing the functionality at block 550 can choose to ignore (e.g., not track) the NLoS satellite(s) so that data from the NLoS satellite(s) is not received. In any case, excluding data from the NLoS satellite(s) helps ensure accuracy of the location determined at block 550. In some embodiments, only a subset of the data from the NLoS satellite(s) may be excluded from a location determination if it is determined that the subset of data corresponds to indirect (multipath) signals, where data that is not excluded includes direct LoS signals from the NLoS satellite(s). Some embodiments may exclude all data from the NLoS satellite(s). The location determination performed at block 550 may include outlier filtering and/or other techniques for identifying satellite data to exclude, depending on desired functionality.

Means for performing the functionality of block 550 can include hardware and/or software components of a computer, such as processing unit(s) 610, bus 605, memory 660, and/or sensor(s) 640 of the computing device 600 illustrated in FIG. 6 and described in more detail below.

At block 560, the functionality includes providing the location of the vehicle. This functionality can vary, depending on the system(s) performing the method 500 of FIG. 5, the scenario, and/or other such factors. For example, in some embodiments, such providing may comprise showing, on a display of the vehicle, the indication of the location of the vehicle. The display can comprise, for example, a graphical user interface that may provide a user with location determination and optionally navigation information. In some embodiments, such providing may comprise sending the indication of the location of the vehicle wirelessly to a device separate from the vehicle. Other devices can use this information for a variety of purposes. For example, one such device may comprise a location, traffic, or other type of computer server, which may be maintained by a governmental agency, other public entity, private company, etc., configured to provide traffic, location, and/or navigational information for a given geographical region for consumer consumption, emergency service utilization, traffic control (e.g., Department of Transportation utilization), etc. Other devices that receive the location determination may comprise computing devices of other vehicles (e.g., providing navigation, autonomous driving functionality, etc.), enabling these other vehicles to potentially alter navigation routes, speed, and/or other functions based on the determined location of the vehicle. Another device could comprise a mobile device (e.g., mobile phone, tablet, etc.) of a user riding in the vehicle. Where the vehicle has multiple devices (e.g., a device to perform the method 500 of FIG. 5, and another to interact with a user), providing the location of the vehicle may comprise providing the indication of the location of the vehicle from one device of the vehicle to another.

Means for performing the functionality of block 560 can include hardware and/or software components of a computer, such as processing unit(s) 610, output device(s) 615, wireless communication interface 630, GNSS receiver 680, bus 605, memory 660, and/or sensor(s) 640 of the computing device 600 illustrated in FIG. 6 and described in more detail below.

Figure 6:
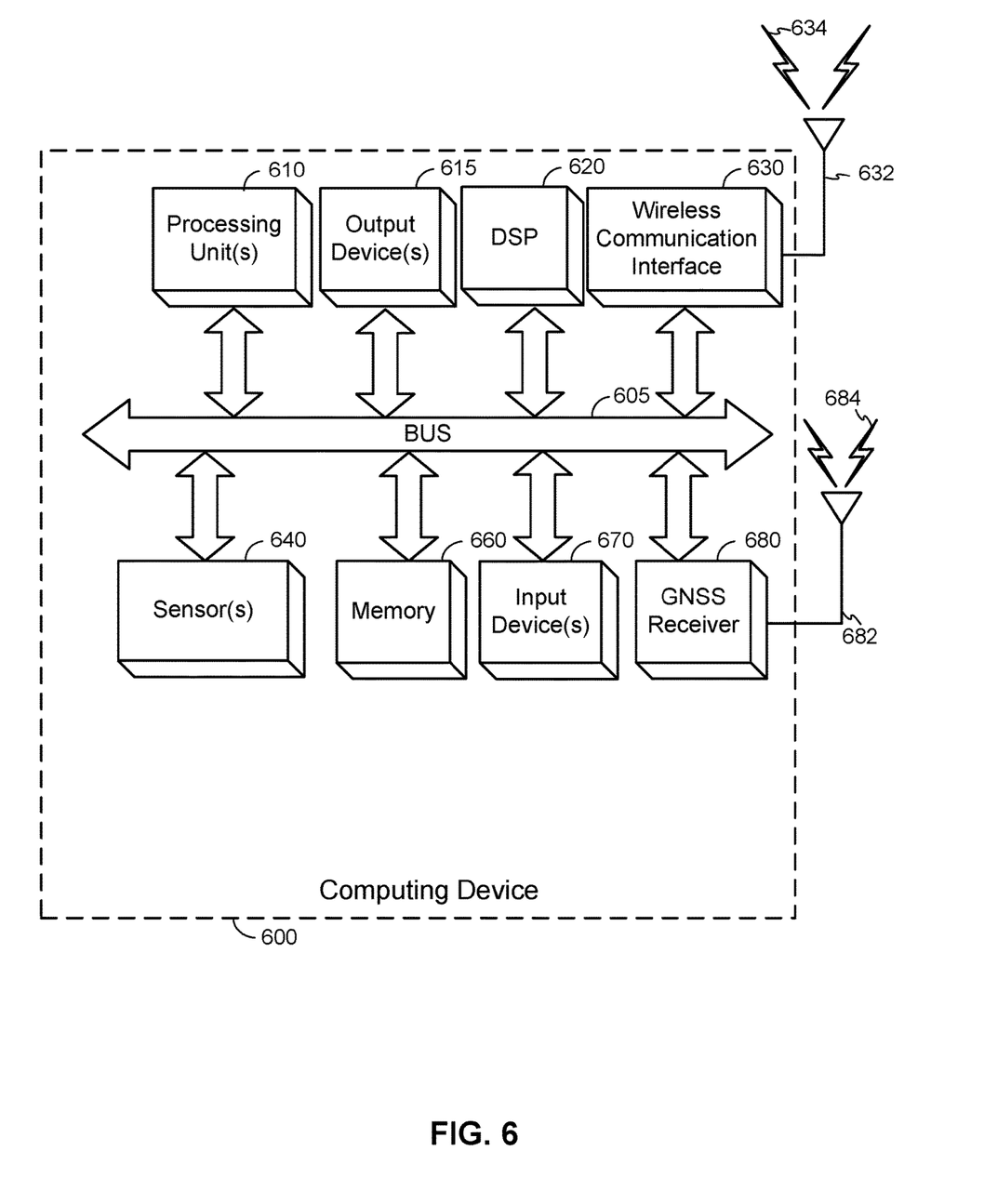
FIG. 6 is an example embodiment of an on-board computer or other computing device, capable of performing at least a portion of some or all of the methods described herein.

FIG. 6 illustrates an embodiment of a computing device 600, which can be utilized in the embodiments and/or incorporated into a vehicle, as described in the embodiments provided herein. FIG. 6 is meant only to provide a generalized illustration of various components, any or all of which may be included or omitted as appropriate. It can be noted that, in some instances, components illustrated by FIG. 6 can be localized to a single physical device and/or distributed among various networked devices, which may be disposed at different physical locations throughout the vehicle and/or disposed at a remote physical location. The computing device 600 may be configured to execute one or more functions of the methods described herein, such as the methods corresponding to the functionality described in relation to FIGS. 2-5. It can be further noted that the computing device 600 may be configured to perform other functions related to the vehicle, which may pertain to safety, autonomous and/or semi-autonomous driving, navigation, etc.

The computing device 600 is shown comprising hardware elements that can be electrically coupled via a bus 605 (or may otherwise be in communication, as appropriate). The hardware elements may include a processing unit(s) 610 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 6, some embodiments may have a separate DSP 620, depending on desired functionality. The computing device 600 also may comprise one or more input devices 670, which may comprise without limitation one or more touch screens, touch pads, microphones, buttons, dials, switches, and/or the like, which may provide for user input and/or input from one or more additional systems of the vehicle. Output devices 615 may comprise, without limitation, one or more displays, light emitting diode (LED)s, speakers, interfaces to other on-board devices and/or systems, and/or the like.

The computing device 600 might also include a wireless communication interface 630, which may comprise without limitation a modem, a network card, an infrared communication device, a wireless communication device, and/or a chipset (such as a Bluetooth (or BLE) device, an IEEE 802.11 device, an IEEE 802.15.4 (or ZIGBEE) device, a WIFI device, a WiMAX device, cellular communication facilities, etc.), and/or the like. The wireless communication interface 630 may permit data to be communicated with a network, vehicle, a location server, wireless access points, other computer systems, and/or any other electronic devices described herein. The communication can be carried out via one or more wireless communication antenna(s) 632 that send and/or receive wireless signals 634.

Depending on desired functionality, the wireless communication interface 630 may comprise separate transceivers to communicate with different devices, which may be on different networks. These different data networks may comprise various network types. A wireless wide area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The computing device 600 can further include sensor(s) 640. Such sensors may comprise, without limitation, one or more IMUs (e.g., accelerometer(s), gyroscope(s), etc.) cameras (including the forward-facing camera described in the embodiments herein), magnetometers and/or other compasses, altimeters, microphones, proximity sensors, light sensors, and the like. In some embodiments, the sensor(s) 640 may additionally or alternatively include vehicle-related sensors (e.g., tire pressure sensors, speedometer, odometer, etc.). Such sensors may, among other things, be utilized as described herein to determine vehicle movement between successively-captured frames of a camera.

Embodiments of the computing device 600 may also include a GNSS receiver 680 capable of receiving signals 684 from one or more GNSS satellites using an GNSS antenna 682, and being powered on and off in the manner described in the embodiments provided herein. Such positioning can be utilized to complement and/or incorporate the techniques described herein. The GNSS receiver 680 can extract a position of the computing device 600, using conventional techniques, from GNSS satellite vehicles (SVs) of an GNSS system, such as Galileo, GLONASS, Compass, Quasi-Zenith Satellite System (QZSS) over Japan, Indian Regional Navigational Satellite System (IRNSS) over India, Beidou over China, and/or any other satellite positioning system (SPS). Moreover, the GNSS receiver 680 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSSes.

The computing device 600 may further include and/or be in communication with a memory 660. The memory 660 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 660 may be used to store the images (or frames) captured by the forward-facing camera as described herein.

The memory 660 of the computing device 600 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer code and/or instructions executable by the computing device 600 (and/or processing unit(s) 610 within a computing device 600). In an aspect, then, such code and/or instructions can be used to configure and/or adapt a general purpose computer (or other device) to perform one or more operations in accordance with the described methods. The memory 660 may therefore comprise non-transitory machine-readable media having the instructions and/or computer code embedded therein/thereon. Common forms of computer-readable media include, for example, magnetic or optical media, a RAM, a PROM, EPROM, a FLASH-EPROM, any other memory chip or cartridge, a carrier wave as described hereinafter, or any other medium from which a computer can read instructions and/or code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of identifying, with respect to a vehicle, non-line-of-sight (NLoS) satellites in a satellite positioning system, wherein the method comprises:
   obtaining a plurality of successive images captured by a camera of the vehicle;
   creating, from the plurality of successive images, a three-dimensional (3-D) model representative of one or more objects obstructing a view of the sky from the perspective of the vehicle;
   using the 3-D model to simulate a view of a virtual upward-facing camera;
   determining one or more NLoS satellites of the satellite positioning system with respect to the vehicle, based on simulated view of the virtual upward-facing camera;
   determining a location of the vehicle by excluding data from the one or more NLoS satellites of the satellite positioning system, based on the determination of the one or more NLoS satellites of the satellite positioning system; and
   providing the determined location of the vehicle.

2. The method of claim 1, wherein the camera comprises a forward-facing camera configured to capture images in a direction of travel of the vehicle.

3. The method of claim 1, wherein obtaining the plurality of successive images is in response to a triggering event.

4. The method of claim 3, wherein the triggering event comprises:
   a determination that the vehicle is within a threshold distance of a certain region, or
   a determination that an image captured by the camera includes an image of an obstruction, or
   any combination thereof.

5. The method of claim 1, wherein the plurality of successive images are captured over a certain period of time, the method further comprising determining a movement of the vehicle during the certain period of time.

6. The method of claim 5, wherein determining the movement of the vehicle during the certain period of time comprises obtaining motion sensor data from one or more motion sensors, the motion sensor data indicative of sensor measurements of the one or more motion sensors captured during the certain period of time.

7. The method of claim 1, wherein determining the one or more NLoS satellites with respect to the vehicle is further based on satellite information indicative of where, from the perspective of the vehicle, the one or more NLoS satellites is in the sky.

8. The method of claim 1, wherein the determining the 3-D model representative of one or more objects obstructing a view of the sky further comprises tracking, over the plurality of successive images, one or more features of a building.

9. The method of claim 1, wherein providing the determined location of the vehicle comprises:
   showing, on a display of the vehicle, the determined location of the vehicle,
   sending, via wireless communication, the determined location of the vehicle to a device separate from the vehicle,
   providing the determined location of the vehicle from one computing device of the vehicle to another, or
   any combination thereof.

10. A computing device comprising:
    a camera configured to capture a plurality of successive images from a vehicle;
    a satellite positioning system receiver;
    a memory; and
    a processing unit communicatively connected with the camera, the memory, and the satellite positioning system receiver, the processing unit configured to:
       create, from the plurality of successive images, a three-dimensional (3-D) model representative of one or more objects obstructing a view of the sky from the perspective of the vehicle;
       use the 3-D model to simulate a view of a virtual upward-facing camera;
       determine one or more NLoS satellites of the satellite positioning system with respect to the vehicle, based on the simulated view of the virtual upward-facing camera;
       determine a location of the vehicle by excluding data from the one or more NLoS satellites of the satellite positioning system, based on the determination of the one or more non-line-of-sight (NLoS) satellites of the satellite positioning system; and
       provide the determined location of the vehicle.

11. The computing device of claim 10, wherein the camera comprises a forward-facing camera configured to capture images in a direction of travel of the vehicle.

12. The computing device of claim 10, wherein, t to cause the camera to capture the plurality of successive images, the processing unit is configured to first determine a triggering event has occurred.

13. The computing device of claim 12, wherein, to determine the triggering event has occurred, the processing unit is configured to determine:
    the vehicle is within a threshold distance of a certain region, or
    an image captured by the camera includes an image of an obstruction, or
    any combination thereof.

14. The computing device of claim 10, wherein the processing unit is configured to:
    cause the camera to capture the plurality of successive images over a certain period of time, and
    determine a movement of the vehicle during the certain period of time.

15. The computing device of claim 14, further comprising one or more motion sensors, wherein to determine the movement of the vehicle during the certain period of time the processing unit is configured to obtain motion sensor data indicative of sensor measurements of the one or more motion sensors captured during the certain period of time.

16. The computing device of claim 10, wherein, to determine the one or more NLoS satellites with respect to the vehicle, the processing unit is configured to use satellite information indicative of where, from the perspective of the vehicle, the one or more NLoS satellites is in the sky.

17. The computing device of claim 10, wherein, to determine the 3-D model representative of one or more objects obstructing a view of the sky, the processing unit is configured to track, over the plurality of successive images, one or more features of a building.

18. The computing device of claim 10, wherein, to provide the determined location, the processing unit is configured to:
cause a display of the vehicle to show the determined location of the vehicle,
cause a wireless transmitter to send, via wireless communication, the determined location of the vehicle to a device separate from the vehicle,
provide the determined location of the vehicle to a second computing device, or
any combination thereof.

19. An apparatus comprising:
means for obtaining a plurality of successive images captured by a camera of a vehicle;
means for creating, from the plurality of successive images, a three-dimensional (3-D) model representative of one or more objects obstructing a view of the sky from the perspective of the vehicle;
means for using the 3-D model to simulate a view of a virtual upward-facing camera;
means for determining one or more NLoS satellites of the satellite positioning system with respect to the vehicle, based on the simulated view of the virtual upward-facing camera;
means for determining a location of the vehicle by excluding data from the one or more NLoS satellites of the satellite positioning system, based on the determination of the one or more non-line-of-sight (NLoS) satellites of the satellite positioning system; and
means for providing the determined location of the vehicle.

20. The apparatus of claim 19, wherein the plurality of successive images are captured over a certain period of time, the apparatus further comprising means for determining a movement of the vehicle during the certain period of time.

21. The apparatus of claim 20, wherein the means for determining the movement of the vehicle during the certain period of time comprises means for obtaining motion sensor data from motion sensing means, the motion sensor data indicative of sensor measurements of the motion sensing means captured during the certain period of time.

22. The apparatus of claim 19, wherein the means for determining the 3-D model representative of one or more objects obstructing a view of the sky further comprises means for tracking, over the plurality of successive images, one or more features of a building.

23. A non-transitory computer-readable medium apparatus having instructions embedded thereon for identifying, with respect to a vehicle, non-line-of-sight (NLoS) satellites in a satellite positioning system, the instructions including computer code for:
obtaining a plurality of successive images captured by a camera of a vehicle;
creating, from the plurality of successive images, a three-dimensional (3-D) model representative of one or more objects obstructing a view of the sky from the perspective of the vehicle;
using the 3-D model to simulate a view of a virtual upward-facing camera;
determining one or more NLoS satellites of the satellite positioning system with respect to the vehicle, based on the simulated view of the virtual upward-facing camera;
determining a location of the vehicle by excluding data from the one or more NLoS satellites of the satellite positioning system, based on the determination of the one or more non-line-of-sight (NLoS) satellites of the satellite positioning system; and
providing the determined location of the vehicle.

24. The non-transitory computer-readable medium of claim 23, wherein the plurality of successive images are captured over a certain period of time, the instructions further including computer code for determining a movement of the vehicle during the certain period of time.

25. The non-transitory computer-readable medium of claim 24, wherein the computer code for determining the movement of the vehicle during the certain period of time comprises computer code for obtaining motion sensor data from motion sensing means, the motion sensor data indicative of sensor measurements of the motion sensing means captured during the certain period of time.

26. The non-transitory computer-readable medium of claim 23, wherein the computer code for determining the 3-D model representative of one or more objects obstructing a view of the sky further comprises computer code for tracking, over the plurality of successive images, one or more features of a building.

* * * * *